United States Patent [19]

McIntyre et al.

[11] Patent Number: 4,790,439

[45] Date of Patent: Dec. 13, 1988

[54] GRADING MACHINE

[76] Inventors: Roger C. McIntyre, P.O. Box 20, Aransas Pass, Tex. 78336; James W. Smith, 402 Del Mar, Corpus Christi, Tex. 78404

[21] Appl. No.: 935,820

[22] Filed: Nov. 28, 1986

[51] Int. Cl.⁴ .............................................. B07C 1/10
[52] U.S. Cl. ................................... 209/667; 209/668; 209/670
[58] Field of Search ............... 209/668, 670, 673, 667, 209/660, 671, 672, 625, 626, 392, 393, 394

[56] References Cited

U.S. PATENT DOCUMENTS

| 446,867 | 2/1891 | Haring | 209/670 |
| 2,702,628 | 2/1955 | Lucius, Jr. et al. | 209/932 |
| 2,989,180 | 6/1961 | Merrick | 209/668 |

FOREIGN PATENT DOCUMENTS 956520  2/1950  France ..................... 209/670

Primary Examiner—Joseph F. Peters, Jr.
Assistant Examiner—Edwin L. Swinehart
Attorney, Agent, or Firm—G. Turner Moller

[57] ABSTRACT

A shrimp grading machine sorts progressively smaller sized shrimp as they fall through the mechanism. Plural pairs of parallel grading rollers are inclined from an upstream inlet end to a downstream outlet end. Graded shrimp are rejected by and will not pass through the gap between horizontally adjacent rollers and thus pass off the end of the grader. A mechanism allows all of the gaps between the horizontally spaced rollers to be simultaneously adjusted.

14 Claims, 3 Drawing Sheets

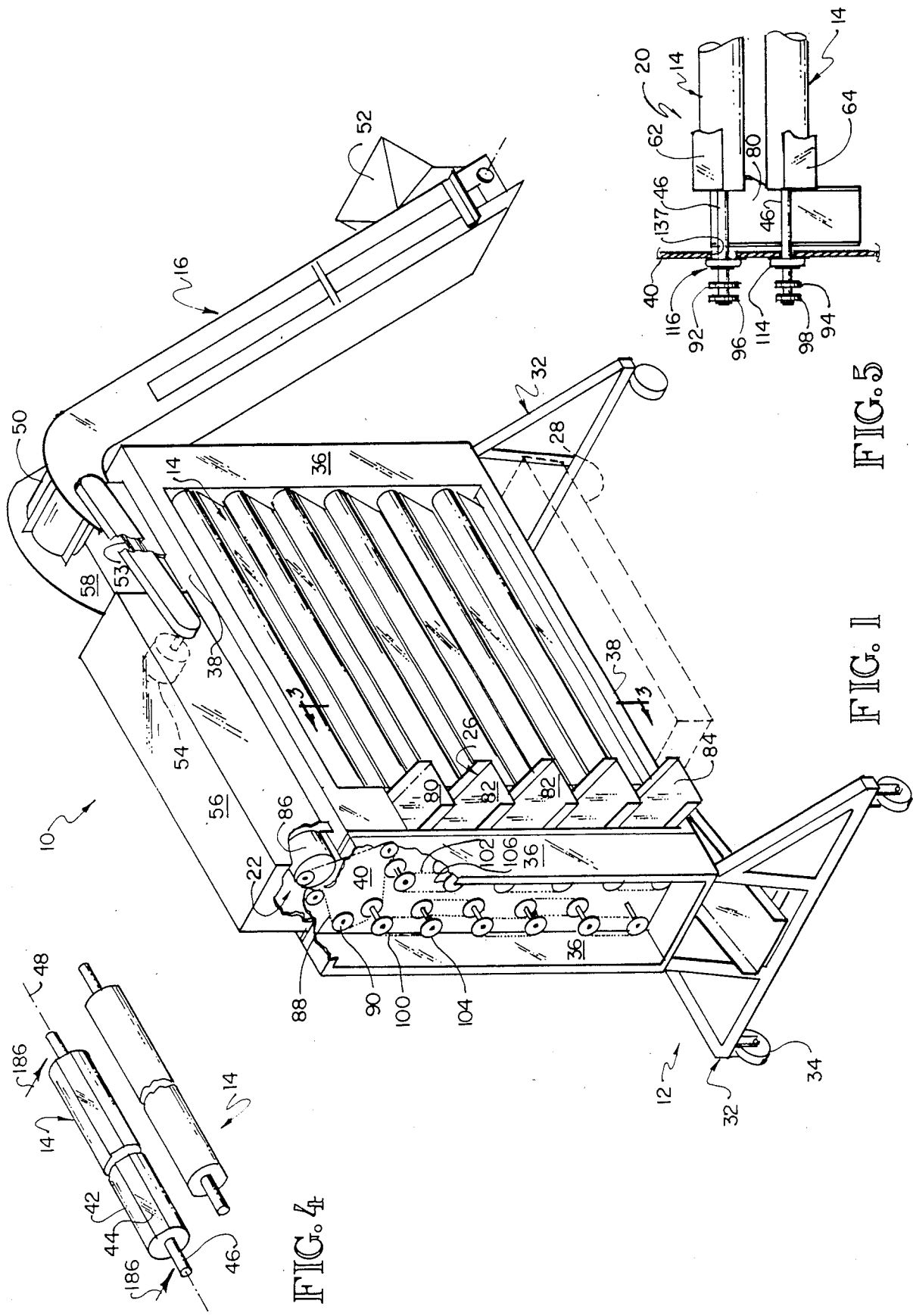

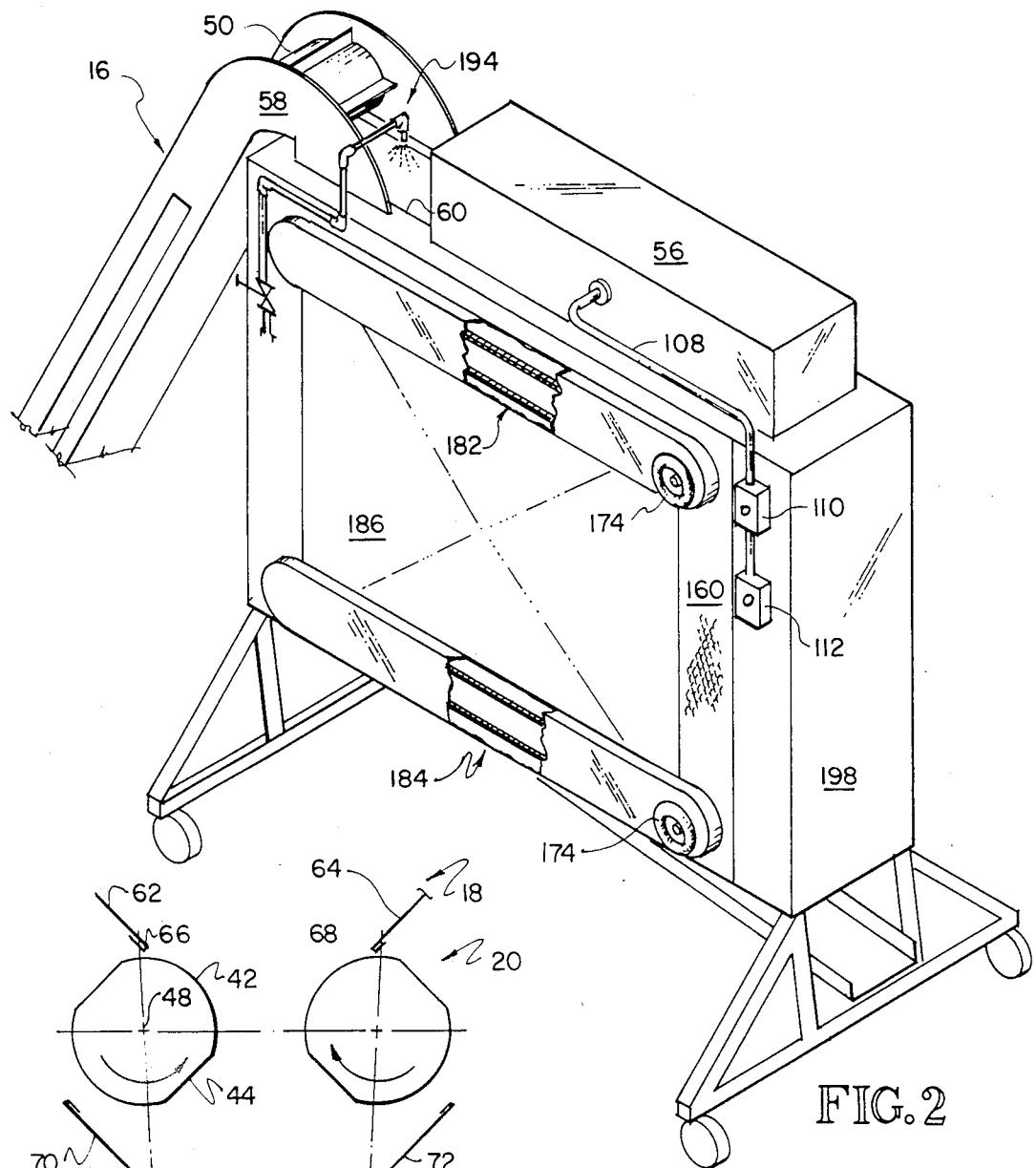
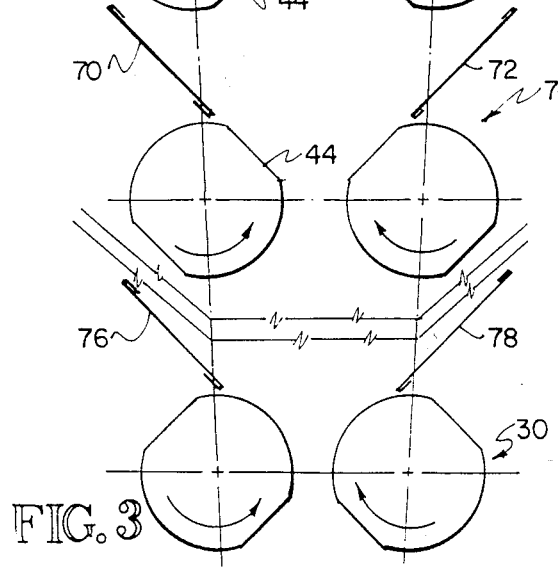
FIG. 3
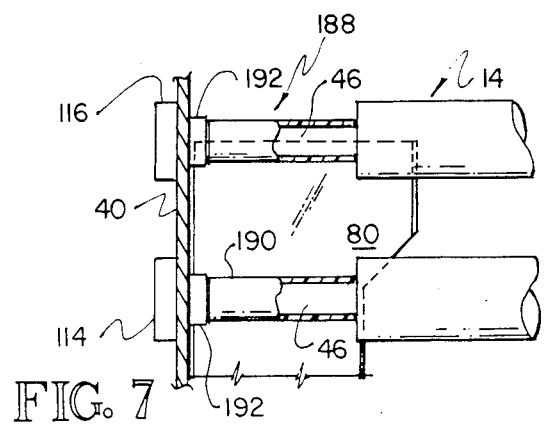
FIG. 7

GRADING MACHINE

This invention relates to a grading machine for sorting articles into predetermined sizes or size ranges.

Grading machines are commonly used to sort agricultural products, such as olives, or marine products, such as shrimp or fish, by size because consumers prefer to purchase items of large size or those which are uniformly sized. As will be more fully apparent hereinafter, the grading machine of this invention has particular application to the grading of shrimp and will be described in conjunction therewith although it is useful in the grading of other articles or objects.

With few exceptions, shrimp are presently graded after the heads are removed, i.e. heads off rather than heads on. Shrimp are graded to size because the price of shrimp per pound varies greatly with size. For example, on a given day, small shrimp having a count of 50 or more to the pound may bring $1.00 a pound at wholesale. Shrimp having a count of 21-25 to the pound may bring $3.50 a pound wholesale, while a count of 26-30 per pound may bring $3.00, a count of 31-35 to the pound may bring $2.50, and a count of 36-40 to the pound may bring $2.00.

Because of the count—price differential, it is important that the grading be done with great accuracy and that from six to twelve size classifications be provided. The standard shrimp graders available to the industry do not have sufficient accuracy nor sufficient grading capacity to allow a catch to be satisfactorily graded during one pass through a machine. Consequently, shrimp processing plants either run the shrimp through successive machines or sort the "oversize" and "undersize" shrimp at a later time through the same machine after readjusting the grading rollers.

The standard shrimp grader comprises two vertically spaced pairs of rollers. The rollers of the upper pair of rollers are parallel and are spaced apart a distance significantly greater than the largest shrimp to be graded. The upper rollers do not grade the shrimp but, instead, orient and drop them into the bight between the lower rollers. Both pairs of rollers are rotated about inclined axes, the lower pair about slightly divergent axes so the shrimp jiggle and jostle their way down the inclined surfaces of the rollers from the high inlet end toward the low outlet end and fall between the rollers into baskets or trays in graded size groups.

The surfaces of both pairs of rollers are precisely cylindrical for the major part of the periphery thereof. The cylindrical section of the rollers is interrupted by a pair of flat sections or chords of the cylindrical section. The rollers are counterrotated, i.e. each roller of the pair rotates in a direction opposite from the other roller. In addition, the rollers rotate in a direction so the facing surfaces are moving upwardly at the bight between the rollers. The orientation of the flat sections is such that they meet in the bight between the rollers once during each revolution of the rollers. The function of the flat sections is not what is expected from looking at them. It would appear, at first blush, that shrimp would fall through the grading rollers when the flat sections face each other because the gap between the rollers is larger. This is not the case because the rollers are counterrotating fast enough that nothing can fall by gravity between the flats. Instead, the primary function of the flats is to disengage any two or more shrimp that may be stuck together thereby preventing a small shrimp from riding down the roller stuck to a larger shrimp causing a small shrimp to end up with much larger shrimp. The flats act to disengage piggybacked shrimp by flipping the pair upwardly. The rollers are adjustable to diverage slightly away from the upper or inlet end of the rollers so the smaller shrimp fall between the rollers nearer the inlet end. Although the rollers of a standard shrimp grader are 10' long, they provide very few sorting zones. Undersize shrimp fall through the gap between the grading rollers in the first few feet, or the first zone, of the grading roller pair. These undersized shrimp have not been sorted for sale because the only thing known about them is that they are smaller than the sorting done in the second zone. The only sorting that is actually done is in the second, third and fourth zones with oversize shrimp falling off the end of the rollers into an oversize tray or chute.

The distance and the divergence between the grading rollers is adjustable to sort whatever is delivered into the inlet. A typical spacing of the grading rollers may be as follows:

TABLE I

| Typical first machine or first sort | |
|---|---|
| first 2.5' or chute 1 | undersize >60 shrimp/lb |
| second 2.5' or chute 2 | 56-60 shrimp/lb |
| third 2.5' or chute 3 | 51-55 shrimp/lb |
| fourth 2.5' or chute 4 | 46-50 shrimp/lb |
| off end | oversize <46 shrimp/lb. |

Thus, a major disadvantage of the standard shrimp grader is that only three commercial grades are obtained in the first sort. Four commercial grades are available on successive machines or sortings because the size of the shrimp coming off the first chute is known. Thus, a typical second sorting machine would have the rollers adjusted to produce sizes as follows:

TABLE II

| Typical second machine or second sort | |
|---|---|
| first 2.5' or chute 1 | 41-45 shrimp/lb |
| second 2.5' or chute 2 | 36-40 shrimp/lb |
| third 2.5' or chute 3 | 31-35 shrimp/lb |
| fourth 2.5' or chute 4 | 26-30 shrimp/lb |
| off end | oversize <25 shrimp/lb. |

Because the most valuable shrimp are those that count less than 25 to the pound, it is evident that a complete sorting of a catch requires three successive grading machines or three successive batch sortings.

Another major defect of standard shrimp sorting machines presently commercially available is that they are incapable of very narrow gradings, i.e. the present standard grader is incapable of producing 21 count shrimp, or 25 count shrimp or 33 count shrimp. This is quite important in high value applications where shrimp are being packaged or prepared for special situations. For example, in shrimp breading operations, it is mandatory to have shrimp which are very narrowly graded, e.g. 26 count shrimp. This is done presently by transporting, on a conveyor, a batch of 26-30 count shrimp in front of workers and having them manually select the largest shrimp off the conveyor. This is obviously expensive and not terribly accurate. A similar problem, and the same solution, occurs when freezing shrimp for delivery to restaurants which will use them for shrimp cocktail. In this situation, the shrimp are not breaded, they are instead quick frozen by the use of any suitable technology such as a cyrogenic tunnel, a brine solution or a blast freezer.

Thus, the present standard shrimp grader has been a remarkable development which sorts shrimp at high throughput rates in a very workable manner. Indeed, the person who devised the flats on the rollers to jiggle loose piggybacked shrimp deserves the appreciation of the industry. The standard shrimp grader does suffer from several defects: (1) too few grades are produced; (2) there is too wide a range of shrimp in each grade produced; (3) the machines are much too large; and (4) it is exceptionally difficult to fabricate long stainless steel rollers which have precisely cylindrical exterior surfaces. The latter problem involves one of those things that is just easier said than done. It will be appreciated, of course, that if the grading surfaces of the rollers are not precisely cylindrical, grading is unsatisfactory. If the diameter has a low spot, shrimp that are too large will pass through the gap. If the diameter has a bulge, no shrimp will pass through it because those small shrimp that would pass have already been removed from the batch.

As might be expected, the prior art contains many disclosures of shrimp grading machines, such as shown in U.S. Pat. Nos. 1,683,918; 2,702,628; 2,989,180 and 3,770,123. Other similar graders are found in U.S. Pat. Nos. 2,343,042 and 2,917,171.

The grader or sorter of this invention comprises a plurality of vertically spaced pairs of inclined grading rollers having downwardly converging chutes orienting the shrimp and delivering them into the bight of the upper set of grading rollers. The rollers are of the same cross-sectional shape as prior art grading rollers but are much shorter and are parallel rather than divergent. When a batch of shrimp are placed in the inlet, any oversize shrimp move along the upper surface of the upper rollers, pass off the end and comprise an "oversize" group.

Any shrimp passing through the upper set of grading rollers fall onto chutes directing them into the bight of the next lower pair of inclined parallel grading rollers. The rollers of this pair are spaced apart a smaller distance than the next higher set of rollers. Thus, the size rejected by the second set of rollers passes off the end of the grader and is of commercial grade. It will accordingly be seen that the technique of this invention is, in one sense, the opposite of the prior art technique. Shrimp graded with this invention are rejected by the rollers and pass off the end while, in the prior art, the graded shrimp pass between the grading rollers. By providing a series of vertically spaced pairs of horizontally spaced grading rollers, a fairly large number of grades can be obtained with a single sorting device or with a single pass through the device.

A prototype of this invention has worked satisfactorily in commercial operations to grade shrimp in a very narrow range, i.e. single count shrimp. The prototype has also worked well in a conventional grading operation where an essentially mixed catch is graded. There is some uncertainty about the capacity of the prototype in an ordinary grading operation. Standard commercial graders have a nominal or expected capacity of 1000 pounds per hour per pair of grading rollers. There seems little doubt that the measured capacity of any grader is affected by the quality of the shrimp passing therethrough, i.e. are the shrimp fresh or stale, and the average size of the graded shrimp. Because a grader is handling discrete pieces, it seems apparent that a catch having an average 40 count size could not be graded as fast, when stated in weight per unit time, as a catch having an average 20 count size. Similarly, it is apparent that fresh shrimp can be graded more quickly than not so fresh shrimp because the later tends to stick to various parts of the grader and to each other while fresh shrimp do not. In one measured test, the prototype of this invention graded 1000 pounds of shrimp per hour, but how this would have compared to a standard machine grading the same shrimp at the same time is not known.

An important feature of the grading device of this invention is that the rollers are simultaneously adjustable to vary the grading distance or gap between horizontally adjacent rollers. This allows the device to be converted quickly from grading one size range to another size range. As will be more fully apparent hereinafter, the gaps can be so finely adjusted as to provide a grade of a single count, e.g. 30 count shrimp.

It is an object of this invention to provide an improved grading device which delivers a relatively large number of grades of objects, such as shrimp.

Another object of this invention is to provide an improved grading device which can be adjusted to deliver quite narrow sizes therefrom.

Other objects and advantages of this invention will become more fully apparent as this description continues, reference being made to the accompanying drawings and appended claims.

IN THE DRAWINGS

FIG. 1 is an isometric view of a grading machine of this invention from one side thereof;

FIG. 2 is an isometric view of the grading machine of FIG. 1 from the other side thereof;

FIG. 3 is an enlarged cross-sectional view of the grading machine of FIG. 1, taken substantially along line 3—3 thereof, as viewed in the direction indicated by the arrows;

FIG. 4 is an isometric view of a single roller pair;

FIG. 5 is a partial top view of the discharge end of the uppermost roller pair;

FIG. 7 is a view similar to FIG. 5 illustrating an improved embodiment of the invention, certain parts being broken away for clarity of illustration.

Figure 6:
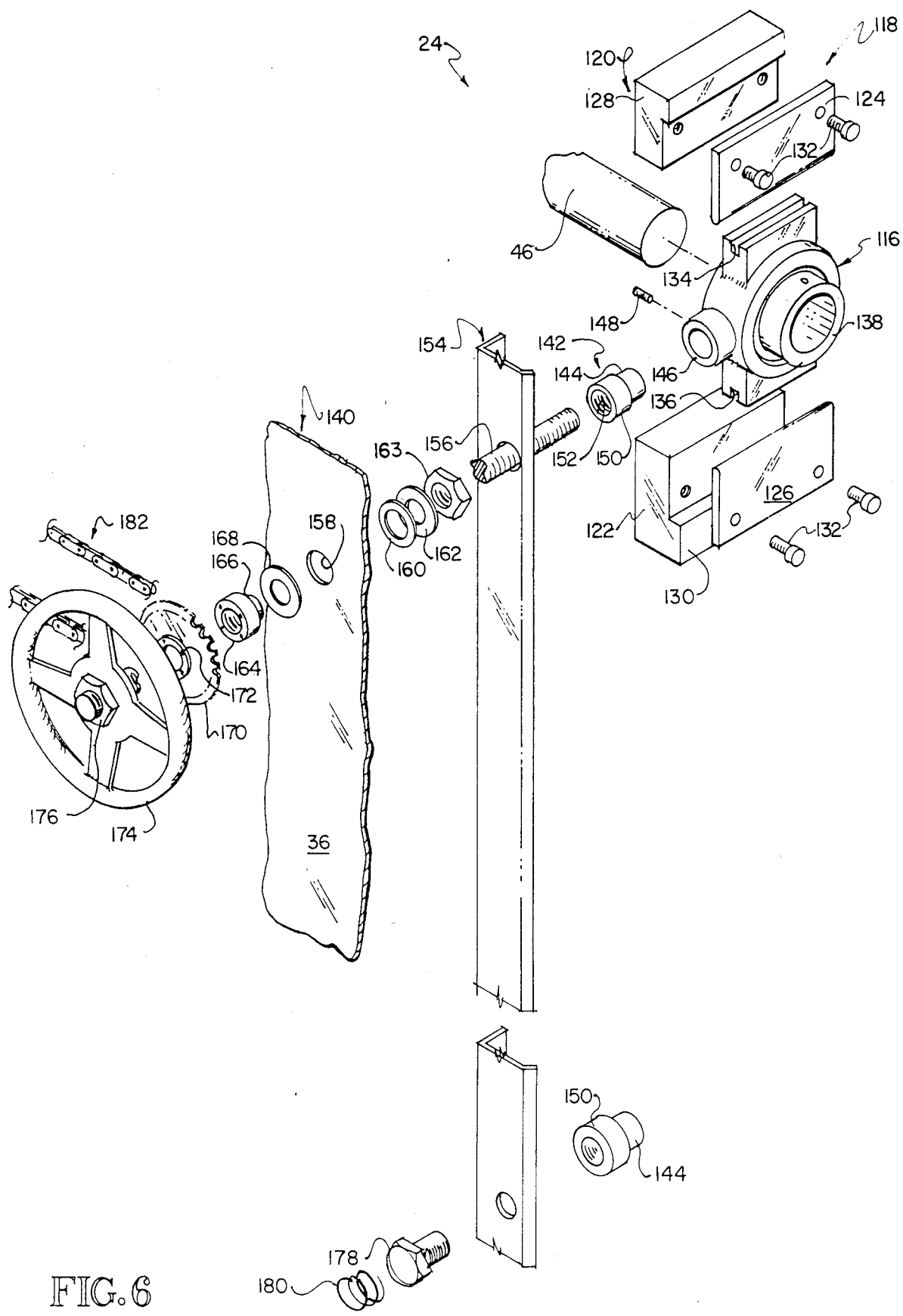
FIG. 6 is an exploded view illustrating the mechanism for adjusting the gaps between the pairs of rollers.

Referring to FIG. 1-6, there is illustrated a grader or sorter 10 of this invention comprising, as major components, a frame 12 carrying plural pairs of grading rollers or spindles 14, means 16 for delivering unsorted shrimp or other articles into the grader 10, means 18 for orienting or guiding shrimp or other articles into the bight between the rollers of the uppermost pair 20, means 22 for rotatably driving the rollers 14, means 24 for simultaneously adjusting the gap between horizontally adjacent rollers, means 26 for collecting shrimp or other articles from the outlet ends of each roller pair and means 28 for collecting shrimp or other articles from beneath the lowermost roller pair 30.

The frame 12 serves to support and position the rollers 14 and includes a pair of truss-like members 32 carrying wheels 34 allowing the grader 10 to be rolled from place to place. A pair of upstanding generally box shaped members 36 and horizontal members 38 provide a generally rectangular shape for the frame 12. A pair of end walls 40 complete the frame 12 and receive the shaft ends of the rollers 14 therethrough as will be more fully apparent hereinafter.

The rollers 14 may be of conventional design including a body 42 of precisely cylindrical external shape having a pair of diametrically opposed longitudinally extending flats 44 thereon. The body 42 is accordingly of cylindrical shape throughout the majority of the circumference thereof. A stub shaft 46 extends from each end of the body 42 and mounts the roller 14 for rotation about its central longitudinal axis 48. In the prior art, the roller bodies 42 have been made of a rolled stainless steel sheet with suitable internal supports. It is apparent, of course, that other food grade materials are equally acceptable for the body 42, such as organic polymeric materials such as polyvinyl chloride, polyethylene, polypropylene and the like. As will be more fully apparent hereinafter, the stub shafts 46 extend through the end walls 40 and mount the rollers 14 in a slightly inclined position from an elevated inlet end adjacent the delivering means 16 to an outlet end adjacent the collecting means 26.

The shrimp delivering means 16 is of conventional design and includes an elevating conveyor 50 having a hopper 52 at the bottom thereof. The conveyor 50 is driven by a chain 53 connected to a motor 54 mounted on top of the frame 12 inside a removable enclosure 56. The conveyor 50 includes side walls or rails 58 designed to drop the conveyed shrimp through an opening 60 in the top of the frame 12. The opening 60 is vertically above the inlet end of the rollers 14 to deliver the shrimp onto the guide means 18.

The guide means 18 comprise upper planar chutes 62, 64 which, in the case of a shrimp grader, are at least 45°. At shallower angles, the shrimp tend to stick to the chutes 62, 64 which is, of course, undesirable. The lower ends 66, 68 of the chutes 62, 64 closely approach the circumference of the roller body 42 as shown best in FIG. 3. When the flats 44 are parallel with the chutes 62, 64, they are coplanar therewith as suggested in the central illustration of FIG. 3. By positioning the lower ends 66, 68 of the chutes 62, 64 closely adjacent the roller bodies 42, there is little tendency for parts of the shrimp to become entangled between the chutes 62, 64 and the roller bodies 42. The upper chutes 62, 64, in effect, replace the uppermost rollers of the prior art grading device and act to orient the shrimp so the long axis thereof extends in the direction of the roller axis 48. The chutes 62, 64 also deliver the shrimp into the bight between the rollers of the uppermost pair 20.

As shown in FIG. 3, a pair of chutes 70, 72 reside beneath the uppermost roller pair 20 and deliver any shrimp passing therethrough into the bight between the next subjacent roller pair 74 which comprises one of a number of intermediate roller pairs between the uppermost roller pair 20 and the lowermost roller pair 30 which is also provided with a pair of downwardly convergent guides 76, 78. The relationship between the chutes 70, 72, 76, 78 and the roller pairs 74, 30 is preferably the same as between the chutes 62, 64 and the roller pair 20. The grader 10 may be provided with as many pairs of rollers 14 as is desired. Preferably, the grader 10 includes at least three and, most desirably, at least six pairs of grading rollers 14 to provide a substantial number of commercial grades in a single pass through a single machine which utilizes as little floor space as is reasonable.

As will be more fully apparent hereinafter, the spacing between the rollers of each roller pair 20, 74, 30 is adjustable. The largest shrimp in the batch move down the incline of the uppermost roller pair 20 and fall off the end thereof. As suggested in FIG. 5, they fall between the stub shafts 46 onto the uppermost chute 80 comprising part of the collecting means 26. Those shrimp smaller than the gap between the rollers 14 of the uppermost pair 20 fall into the bight between the next subjacent roller pair. The discharge end of each of the other roller pairs 74, 30 is substantially identical and each discharges graded shrimp onto one of a plurality of intermediate chutes 82 while the lowermost roller pair 30 discharges graded shrimp into the lowermost chute 84. Any underside shrimp fall through the gap between the rollers of the lowermost pair 30 into a tray or basket comprising the collecting means 28.

With six sets of rollers 14 and with normal spacing therebetween, the first pass through the grader 10 of this invention will provide the grading shown in Table III.

TABLE III

| Typical first sort | |
| --- | --- |
| chute 1 - off top roller | oversize <10 shrimp/lb |
| chute 2 - off 2nd roller | 11-15 shrimp/lb |
| chute 3 - off 3rd roller | 16-20 shrimp/lb |
| chute 4 - off 4th roller | 21-25 shrimp/lb |
| chute 5 - off 5th roller | 26-30 shrimp/lb |
| chute 6 - off 6th roller | 31-35 shrimp/lb |
| bottom tray - through 6th roller | undersize >36 shrimp/lb |

A second sorting with the same machine set to grade the underside shrimp or a second machine in series with the first would have the following typical results.

TABLE IV

| Typical second machine or second sort | |
| --- | --- |
| chute 1 - off top roller | 36-40 shrimp/lb |
| chute 2 - off 2nd roller | 41-45 shrimp/lb |
| chute 3 - off 3rd roller | 46-50 shrimp/lb |
| chute 4 - off 4th roller | 51-55 shrimp/lb |
| chute 5 - off 5th roller | 56-60 shrimp/lb |
| chute 6 - off 6th roller | 61-65 shrimp/lb |
| bottom tray - through 6th roller | undersize >66 shrimp/lb |

Thus, in two passes through the same machine or sequentially through two machines, as compared to three in the prior art, a complete commercial grading of a batch of mixed shrimp can be done with a machine that is about the same height and width as a two roller prior art grader but about half the length. A comparison of Tables I-IV reveals that the device of this invention works the opposite from prior art graders because this device produces commercial grades of larger shrimp first rather than last.

As in the prior art, the rollers 14 are rotatably driven in a counter-rotating direction in which the facing surfaces of the bodies 42 are moving upwardly in the bight between the rollers 14. The driving means 22 includes a motor 86 driving an endless chain 88 extending across a pair of idler sprockets 90 and across a pair of driven sprockets 92, 94 mounted on the shafts 46 of the uppermost roller pair 20. The shafts 46 of the uppermost roller pair 20 also include a pair of driving sprockets 96, 98 receiving chains 100, 102 received on sprockets 104, 106 on the next subjacent roller pair 74. It will accordingly be seen that driving the motor 86 causes the rollers 14 to counterrotate as shown in FIG. 3. As shown in FIG. 2, the motor 86, along with the motor 54, are driven through a power cord 108 having a conveyor control switch 110 and a roller control switch 112 therein.

Because of the multiplicity of grading rollers 14 and the desire to provide a flexible grader 10 which can be used to grade a variety of different sizes in a convenient and expeditious manner, the gap adjusting means 24 is provided. Preferably, one of the rollers of each roller pair is stationary and the other roller is movable. The gap adjusting means 24 thus positions the movable roller of each pair and preferably positions a plurality of the movable rollers simultaneously. The basic plan is to adjust the gap between the uppermost roller pair 20 by moving both ends of the movable roller at the same time and then adjust the gap between the lowermost roller pair 30, or vice versa. The gap adjusting means 24, by its construction, positions the movable rollers of the intermediate roller pairs 74 at locations to provide gaps which split the difference between the gaps between the uppermost and lowermost roller pairs 20, 30. For example, if one were to space the uppermost roller pair 20 at a 0.5" gap and the lowermost roller pair at a 0.25" gap, the gaps between the four intermediate roller pairs would be about 0.30", 0.35", 0.40" and 0.45".

As shown best in FIGS. 1, 5 and 6, the stationary rollers of each roller pair include a pair of stationary bearings 114 affixed to the end wall 40 and receiving the stub shafts 46 of one of the rollers 14. The movable rollers of each roller pair include a pair of bearings 116 and means 118 mounting the rollers 14 for movement toward and away from the bearings 114. The mounting means 118 include a pair of generally L-shaped blocks 120, 122 affixed to the end wall 40 in any suitable manner. A rectangular plate 124, 126 is attached to the blocks 120, 122 in the recess between the legs 128, 130 by suitable fasteners 132. The plates 124, 126 are of suitable thickness to be received in a pair of oppositely facing slots 134, 136 of the bearing 116 which is a conventional Model SC take up bearing manufactured by Reliance Electric of Greenville, S.C. Although it appears that the bearings 116 are mounted for exactly linear movement, a slight amount of play between the plates 124, 126 and the slots 134, 136 allows slightly arcuate movement of the bearings 116.

A slot 137 in the end wall 40 allows the stub shaft 46 to pass therethrough and be received in the central bushing 138 of the bearing 116. It will accordingly be seen that both ends of each individual movable roller of the roller pairs 20, 74, 30 are mounted for movement toward and away from the stationary roller of the pair as suggested by the arrows in FIG. 4.

The gap adjusting means 24 also includes means 140 for shifting the movable bearing 116 within the limits of movement afforded by the mounting means 118. To this end, the shifting means 140 includes a sleeve 142 having a small smooth cylindrical end 144 received in a boss 146 of the movable bearing 116 and retained therein in any suitable manner, such as by the use of a set screw 148. The outer end 150 of the sleeve 142 includes an internally threaded passage 152 for purposes more fully apparent hereinafter.

As heretofore described, the gap adjusting means 24 including the mounting means 118 and the shifting means 140 are identical for the movable roller of each roller pair. As will be more fully apparent hereinafter, the relationship between the intermediate movable rollers and an upright bar 154 is different than that of the upper and lower movable rollers.

To this end, in the upper and lower movable rollers, the sleeve 142 is welded to the bar 154 and a lead screw 156 extends through an unthreaded slightly enlarged passage 158 in the wall 40, through a pair of thrust washers 160, 162 and a jam nut 163 into threaded engagement with the passage 152. On the outside of the wall 40, a threaded bushing 164 is received on the lead screw 156 and includes a reduced inner end 166 sized to pass through the opening 158 and receive the thrust washer 160 as well as a second thrust washer 168. The opening 158 in the wall 40 is slightly larger than the inner end 166 which allows the lead screw 156 to tilt slightly as may be necessary when adjusting the position of the bar 154. A sprocket 170 is attached to the bushing 164 by suitable threaded fasteners 172. An adjusting wheel 174 is threaded onto each of the lead screws 156 and a jam nut 176 secures the wheel 174 in place to independently adjust the upper and lower movable bearings 116.

The sleeves 142 of the intermediate movable bearings 116 are attached to the bar 154 in any suitable manner, as by the use of threaded fasteners 178. A plurality of springs 180 independently bias the bar 154 away from the wall 40 and allow the bar 154 to assume its desired inclination depending on the position of the upper and lower lead screws 156.

In effect, the springs 180 push the bar 154 to the right in FIG. 6 as far as is allowed by the lead screw 156. Because the bar 154 can tilt slightly, as allowed by the bushing 164 and opening 158, adjustment of the upper and lower bearings 116 can be done independently without binding the bar 154 or any other component of the shifting means 140. It will accordingly be seen that the bar 154 is floatably mounted and can be moved parallel to the wall 40 or tilted relative thereto.

As shown in FIG. 2, the upper and lower adjusting wheels 174 are mounted on one end of the grader 10 and are connected by upper and lower sprocket and chain arrangements 182, 184 to preferably identical shifting means on the opposite end of the grader 10. Thus, when the upper adjustment wheel 174 is turned to shift the upper movable bearing 116 on one end of the grader 10, the sprocket and chain arrangement 182 shifts the upper movable bearing 116 on the other end of the grader 10 an identical amount as suggested by the arrows 186 in FIG. 4.

In order to adjust the gaps between the rollers 14, the operator adjusts the upper movable bearing 116 to an approximate gap dictated by experience. He then dumps a small amount of previously graded shrimp of known size into the inlet hopper 52, turns the machine on, collects the graded shrimp exiting from the upper chute 80 and weighs them to determine the size thereof. The only reason previously graded shrimp are used is that the upper roller pair 20 rejects oversize shrimp and, if nothing is known about the size of the batch, no commercial grade is obtained. If the size is larger than desired, the upper wheel 174 is turned to narrow the gap between the upper roller pair 20 and the process is repeated until the desired size comes off the upper roller pair 20. The same process is then repeated with the lower roller pair 30 to adjust the shrimp rejected by the lower roller pair 30 onto the lower discharge chute 84. This determines the smallest grade obtained from the sorter 10. The positioning of the movable rollers of the intermediate roller pairs 74 divides the batch into groups between the largest and smallest.

As mentioned previously, one of the major advantages of this invention lies in the ability to obtain single count shrimp from a batch of either previously graded shrimp or previously ungraded shrimp. Assuming that a single count shrimp is desired from a previously sorted batch, for example, one wants the 26 count from a 26–30 batch, the upper roller pair 20 is adjusted to pass substantially all of the shrimp and the lower roller pair 30 is adjusted to reject the smallest of the shrimp. The discharge from a six roller machine will be, from top to bottom respectively, 26 count, 27 count, 28 count, 29 count and 30 count. In the alternative, the upper roller pair 20 may be adjusted to reject only the 26 count shrimp and the lower adjustable roller may be opened up so that the 27–30 count shrimp simply fall through the grader 10 into the lower tray 26.

Another major advantage of the grader 10 of this invention lies in the ability to grade "heads on" shrimp. Prior art graders are ineffective because the shrimp tend to get thrown by the grading rollers into the gap between the upper rollers and the grading rollers. This coupled with the tendency of the antenna and/or legs of one shrimp to become entangled with the horn of an adjacent shrimp makes the prior art grader unsuitable because the operator is frequently stopping the machine to cure a blockage.

Grading of heads on shrimp with the grader 10 of this invention has been uneventful except that shrimp tend to wrap around the stub shafts 46 at the discharge end of the grading rollers 14 as seen in FIG. 5. One solution to this difficulty is shown in FIG. 7 which is intended to be identical to FIG. 5 except that the chutes 62, 64 have been removed to better illustrate the improvement comprising means 188 for keeping antenna off the stub shafts 46 at the discharge ends of the rollers 14. The means 188 comprises a sleeve 190, conveniently of plastic such as polyvinyl chloride or the like, slipped over the end of each of the stub shafts 46. The sleeves 190 are free to rotate relative to the stub shafts 46 but preferably have an internal diameter only slightly greater than the outer diameter of the stub shaft 46. A stop collar 192 is affixed to each stub shaft 46 near the wall 40 in any suitable fashion, as by the use of a set screw (not shown) or the like. The stop collars 192 merely prevent the sleeves 190 from moving axially any great distance. In the event a shrimp antenna lays over the sleeve 190, there is no tendency for them to wind around the sleeve 190 because it is not rotatably driven. If an antenna does become wound about the sleeve 190 and the shrimp is hanging therefrom, the weight of the shrimp is sufficient to rotate the sleeve 190 in an unwinding direction to allow the shrimp to fall onto the discharge chute 80.

The sorter 10 may also be equipped with other conventional accessories usual in grading operations, such as a water spray system 194, see FIG. 2, for wetting shrimp and facilitating their movement through the grader 10. Similarly, suitable side body panels 196 and end panels 198 enclose the working mechanisms of the grader 10, prevent workers from getting their fingers in the device and provide for a professional appearance.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A device for sorting articles according to size, comprising
   a frame;
   a multiplicity of vertically spaced pairs of laterally spaced rollers mounted on the frame for rotation about parallel inclined axes in an inclined orientation from an elevated inlet end to an outlet end lower than the inlet end,
   the rollers of each pair being spaced apart at a bight therebetween a greater distance than that of the rollers of the next subjacent pair,
   each of the rollers including an external surface at least the majority thereof comprising a cylinder and a flat section comprising a chord of the cylinder, the flat section of each roller facing the flat section of the laterally spaced roller in the bight during rotation of the rollers,
   the rollers of each pair being positioned to deliver articles passing through the bight therebetween into the bight of the next subjacent pair;
   guide means comprising first and second upwardly diverging planar chutes each having a lower end disposed adjacent the bight between the rollers of a first pair and an upper end extending upwardly to adjacent a plane defined by the bottom of the rollers in the pair immediately above the first pair, the chutes and the flat roller sections being coplanar once during each revolution of the rollers;
   means for delivering the articles into the bight of the uppermost pair of rollers;
   means for rotating the rollers in opposite directions with facing surfaces moving upwardly; and
   means adjacent the outlet end of each pair of rollers for separately collecting the articles rejected thereby.

2. The device of claim 1 further comprising means under the lowermost pair of rollers for collecting the articles passing therebetween.

3. The device of claim 1 further comprising means for simultaneously adjustably moving opposite ends of one of the rollers of the first roller pair and maintaining the rollers of the first roller pair parallel.

4. The device of claim 1 further comprising a plurality of first stationary bearing pairs on the frame for rotatably mounting a first roller of each roller pair about a first fixed axis and adjusting means including a plurality of second bearing pairs for rotatably mounted a second roller of each roller pair about a second axis and means for simultaneously moving the second bearing pairs relative to the first bearing pairs and maintaining the first rollers parallel to the second rollers.

5. The device of claim 4 wherein the bearings of the first pairs are generally vertically aligned in a first plane and the bearings of the second pair are generally vertically aligned in a second plane laterally spaced from the first plane.

6. The device of claim 5 wherein the means simultaneously moving the second bearing pairs comprise an upright bar having upper and lower ends and means connecting each bearing of the second bearing pairs to the upright bar, a spring biasing the bar in a first direction in an adjusting path of movement of the second bearing pairs, an upper lead screw theadably connected to the bar adjacent the upper end thereof for moving the upper end of the bar in a second direction opposite from the first direction, and a lower lead screw threadably connected to the bar adjacent the lower end thereof for moving the lower end of the bar in a second direction opposite from the first direction.

7. The device of claim 1 wherein there are at least three vertically spaced pairs of laterally spaced inclined rollers.

8. The device of claim 7 wherein there are at least six vertically spaced pairs of laterally spaced inclined rollers.

9. The device of claim 1 wherein the rollers each comprise a stub shaft extending beyond the cylindrical external surface of the roller and the last mentioned means comprise a collecting chute disposed vertically below the stub shafts of each roller pair for receiving articles passing off the outlet end thereof.

10. The device of claim 9 wherein the chutes of each roller pair are substantially parallel.

11. The device of claim 1 wherein the diverging chutes extend along the axial extent of the rollers from the inlet end thereof to the outlet end thereof.

12. A device for sorting shrimp according to size, comprising a frame;

a multiplicity of vertically spaced pairs of laterally spaced rollers mounted on the frame for rotation about parallel inclined axes in an inclined orientation from an elevated inlet end to an outlet end lower than the inlet end, each of the rollers including an external surface at least the majority thereof comprising a cylinder, the rollers each comprise a flat section comprising a chord of the cylindrical surface, the flat section of each roller facing the flat section of the horizontally spaced roller in the bight during rotation of the rollers, the rollers of each pair being spaced apart at a bight therebetween a greater distance than that of the rollers of the next subjacent pair, the rollers of each pair being positioned to deliver articles passing through the bight therebetween into the bight of the next subjacent pair;

the rollers each comprise a stub shaft extending beyond the cylindrical external surface of the roller and further comprising means preventing shrimp antenna from winding about the stub shaft;

means for delivering the articles into the bight of the uppermost pair of rollers;

means for rotating the rollers in opposite directions with facing surfaces moving upwardly; and means adjacent the outlet end of each pair of rollers for separately collecting the articles rejected thereby.

13. The device of claim 12 wherein the preventing means comprise a sleeve rotatably received on the stub shaft.

14. A device for sorting shrimp according to size, comprising a frame and a pair of laterally spaced grading rollers mounted on the frame for rotation about a pair of inclined axes in an inclined orientation from an elevated inlet end to an outlet end lower than the inlet end, each of the rollers including an external cylindrical surface having at least one generally planar chord and a stub shaft, at the outlet end, extending beyond the cylindrical surface, means for delivering shrimp into the bight of the grading rollers;

means for rotating the rollers in opposite directions with facing surfaces moving upwardly;

means for collecting shrimp sorted by the device; and means for preventing shrimp parts from wrapping around the stub shafts at the outlet end thereof comprising a sleeve rotatably received on the stub shaft.

* * * * *